(No Model.)

C. C. WORTHINGTON.
STRAINER.

No. 603,120. Patented Apr. 26, 1898.

Attest:
A. V. Bourke
Gussie White

Inventor:
Charles C. Worthington
By Phil P. Phelps Seuy
Attys

UNITED STATES PATENT OFFICE.

CHARLES C. WORTHINGTON, OF IRVINGTON, NEW YORK.

STRAINER.

SPECIFICATION forming part of Letters Patent No. 603,120, dated April 26, 1898.

Application filed June 10, 1897. Serial No. 640,118. (No model.)

*To all whom it may concern:*

Be it known that I, CHARLES C. WORTHINGTON, a citizen of the United States, residing at Irvington, county of Westchester and State of New York, have invented certain new and useful Improvements in Strainers, fully described and represented in the following specification and the accompanying drawings, forming a part of the same.

The object of this invention is to provide an improved strainer or screen for water or other fluids, to be placed in pipes through which such fluids flow, as in the suction-pipes of pumps, feed-pipes to boilers, and wherever else it is desired to intercept sediment or other foreign matter carried by the fluid.

A construction embodying the various features of the invention in the preferred form is shown in the accompanying drawings, in which—

Figure 1:
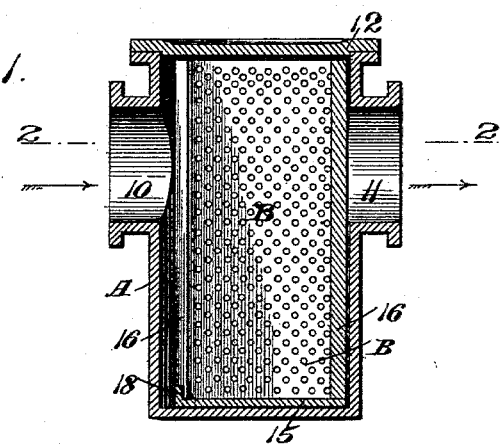
Figure 2:
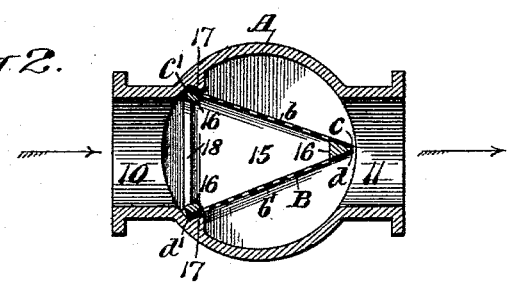
Figure 3:
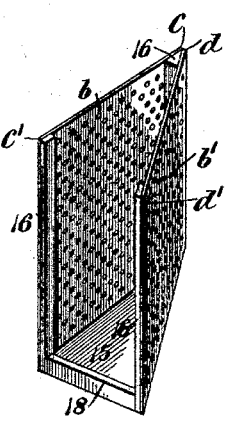

Figure 1 is a central sectional view of such a construction; Fig. 2, a section on line 2 of Fig. 1; Fig. 3, a perspective view of the strainer or screen proper removed from the casing.

Referring to the drawings, A is a casing, preferably cylindrical, forming a closed chamber or cistern, and provided with inlet and outlet branches 10 11 for connection with the ends of the pipe or main, and communicating with the interior of the chamber on opposite sides of the casing and at some distance from the bottom of the casing. This casing is provided with a removable cover 12 at one end, preferably the top, as shown. Inside the casing is a vertical strainer or screen B, formed of a suitable straining-sheet in two sections $b\ b'$, having their vertical edges $c\ d$ connected at the outlet side of the chamber and diverging, so that their edges $c'\ d'$ engage the walls of the chamber on either side of the inlet 10, as shown. The strainer being thus in the form of a hollow wedge open at the base and extending the full height of the chamber will form a partition dividing the chamber into two parts, with one of which parts the inlet 10 communicates and with the other of which parts the outlet 11 communicates, so that any water entering through the inlet must consequently pass through the strainer in order to reach the outlet. It will be noticed that with the straining-sheet arranged in this manner—that is, in sections lying in planes oppositely inclined to the direction of flow of the water and forming a partition between the inlet and the outlet in the chamber—I secure a very large straining-surface in proportion to the size of the casing A. There will consequently be but a very slight obstruction of the flow of the water, even with a casing quite small in proportion to the size of the main, as shown. There will also be a comparatively slow flow of the water through the strainer, and this in connection with the feature of the straining-sheet being at an angle to the general direction of flow of the water insures a more perfect action of the strainer and a lessened liability of the strainer becoming clogged in use. The arrangement of the parts is such, also, that the outlet and inlet may be directly opposite each other, so that the pipe in which the strainer is placed need not be moved out of line. It will also be noticed that as the chamber and strainer contained therein extend some distance below the inlet and outlet to the chamber the movement of the water in the lower part of the chamber will be less than in the part directly between the inlet and outlet, so that sediment or other foreign matter intercepted by the strainer and falling to the bottom of the chamber will not be disturbed, and the water passing through the strainer will not be brought into contact with the foreign matter, which has been separated from water which has previously passed through the strainer.

The strainer B is preferably constructed, as shown in the drawings, of suitable straining-sheets, preferably perforated plates, extending upward from a triangular bottom piece 15 and preferably strengthened by upright bars 16. For the purpose of holding the strainer in place in the casing A when said casing is of the preferred cylindrical form shown fixed bars or ribs 17 are provided on the interior walls of the casing which serve as guides for the strainer on either side of the inlet 10. The strainer may thus be readily removed from the chamber for cleaning or renewal when the cover 12 has been removed. The bottom 15 of the strainer is preferably provided along the edge corresponding to the open side of the strainer with a flange or ledge 18 for retaining on the bottom of the strainer matter which has been separated out from the water passing through it.

It will be understood that I am not to be limited to the exact construction shown, but that various changes may be made in the preferred construction shown without departing from the invention as claimed. For example, while I prefer to form the strainer proper with two oppositely-inclined sections, so as to form a hollow-wedge-shaped strainer, and while such an arrangement forms a feature of the invention, yet I am not to be limited to a screen having only two inclined sections.

What I claim is—

1. The combination with a chamber having an inlet and an outlet, of a strainer having a plurality of substantially vertical sections lying in planes oppositely inclined to the direction of flow of the fluid and forming a partition between the inlet and outlet, substantially as described.

2. The combination with a chamber having an inlet and an outlet, of a strainer having a plurality of substantially vertical sections lying in planes oppositely inclined to the direction of flow of the fluid, and the edges of the strainer embracing the inlet-opening, substantially as described.

3. The combination with a chamber having an inlet and an outlet and extending below said inlet and outlet, of a strainer having two or more substantially vertical sections lying in planes oppositely inclined to the direction of flow of the fluid and forming a partition between the inlet and outlet, substantially as described.

4. The combination with a chamber having an inlet and an outlet, of a strainer having two substantially vertical sections lying in planes oppositely inclined to the direction of flow of the fluid, and the edges of the strainer embracing the inlet-opening, substantially as described.

5. The combination with a vertical cylindrical chamber having an inlet and an outlet and extending below said inlet and outlet, of a strainer in said chamber having two substantially vertical sections lying in planes oppositely inclined to the direction of flow of the fluid, and the edges of the strainer embracing the inlet-opening, substantially as described.

6. The combination of a casing having an inlet and an outlet on opposite sides of the casing and said casing extending below the inlet and outlet, and the hollow-wedge-shaped strainer B, substantially as described.

7. The combination of the cylindrical casing A having an inlet and an outlet, the hollow-wedge-shaped strainer B, and guides 17 for said strainer, substantially as described.

8. The combination of the cylindrical casing A having an inlet and an outlet on opposite sides of the casing and said casing extending below said inlet and outlet and having a removable cover 12, and the hollow-wedge-shaped strainer B having the bottom 15, substantially as described.

9. The combination of a casing having an inlet and an outlet, and the strainer B formed of the perforated plates $b$ and $b'$, bottom 15 and uprights 16, substantially as described.

10. The combination of a casing having an inlet and an outlet on opposite sides of the casing and said casing extending below said inlet and outlet, and the hollow-wedge-shaped strainer B having the bottom 15 provided with an upwardly-extending flange 17 on its edge corresponding with the open side of the strainer, substantially as described.

In testimony whereof I have hereunto set my hand in the presence of two subscribing witnesses.

CHARLES C. WORTHINGTON.

Witnesses:
 ANDREW J. CALDWELL,
 BOWEN W. PIERSON.